(12) United States Patent
Christophersen et al.

(10) Patent No.: US 10,473,692 B2
(45) Date of Patent: Nov. 12, 2019

(54) METHOD OF CALIBRATING A NANOMETROLOGY INSTRUMENT

(71) Applicants: Marc Christophersen, Berwyn Heights, MD (US); Bernard F. Phlips, Great Falls, VA (US); Andrew J. Boudreau, Washington, DC (US); Michael K. Yetzbacher, Burke, VA (US)

(72) Inventors: Marc Christophersen, Berwyn Heights, MD (US); Bernard F. Phlips, Great Falls, VA (US); Andrew J. Boudreau, Washington, DC (US); Michael K. Yetzbacher, Burke, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 76 days.

(21) Appl. No.: 14/860,947

(22) Filed: Sep. 22, 2015

(65) Prior Publication Data

US 2016/0091703 A1   Mar. 31, 2016

Related U.S. Application Data

(60) Provisional application No. 62/057,333, filed on Sep. 30, 2014.

(51) Int. Cl.
*G01Q 40/02* (2010.01)
(52) U.S. Cl.
CPC .................. *G01Q 40/02* (2013.01)

(58) Field of Classification Search
CPC ...................................................... G01Q 40/02
See application file for complete search history.

(56) References Cited

U.S. PATENT DOCUMENTS

| | | | | |
|---|---|---|---|---|
| 3,472,615 A | * | 10/1969 | Wang ..................... | C01B 13/14 117/2 |
| 5,534,359 A | * | 7/1996 | Bartha ................... | G01Q 40/02 428/210 |

(Continued)

OTHER PUBLICATIONS

Binnig et al., "Surface Studies by Scanning Tunneling Microscopy", Physical Review Letters, Jul. 5, 1982, pp. 57-61, vol. 49, No. 1, The American Physical Society, College Park, MD, USA.

(Continued)

*Primary Examiner* — Lisa M Caputo
*Assistant Examiner* — Alex T Devito
(74) *Attorney, Agent, or Firm* — US Naval Research Laboratory; Suresh Koshy (57) ABSTRACT

A method of calibrating a topography metrology instrument using a calibration reference, which includes a substrate and a plurality of bi-layer stacks. Each bi-layer stack includes a plurality of bi-layer steps. At least one bi-layer step of the plurality of bi-layer steps includes two materials. The at least one bi-layer step of the plurality of bi-layer steps includes an etch stop layer and a bulk layer. The calibration reference includes a calibration reference step profile includes a plurality of predetermined bi-layer stack heights. The calibration reference step profile and the predetermined bi-layer stack heights are measured using a topography metrology instrument. The topography metrology instrument is calibrated based on the measured calibration reference step profile and the measured bi-layer stack heights.

11 Claims, 8 Drawing Sheets

(56) References Cited

U.S. PATENT DOCUMENTS

| | | | | | |
|---|---|---|---|---|---|
| 5,578,745 | A | * | 11/1996 | Bayer | G01Q 40/02 73/1.73 |
| 5,602,323 | A | * | 2/1997 | Ohmi | C23F 1/00 216/24 |
| 5,955,654 | A | * | 9/1999 | Stover | G01B 11/30 73/1.89 |
| 6,016,684 | A | * | 1/2000 | Scheer | G01Q 40/02 250/252.1 |
| 6,869,480 | B1 | * | 3/2005 | Abel | C30B 29/36 117/101 |
| 2005/0045819 | A1 | * | 3/2005 | Bedell | G01N 23/04 250/307 |
| 2008/0251868 | A1 | * | 10/2008 | Nakayama | G01N 23/225 257/429 |
| 2012/0048831 | A1 | * | 3/2012 | Rueger | H01J 37/32009 216/67 |

OTHER PUBLICATIONS

Binnig et al., "Atomic Force Microscope", Physical Review Letters, Mar. 3, 1986, pp. 930-934, vol. 56, No. 9, The American Physical Society, College Park, MD, USA.

Christophersen et al., Gray-tone Lithography Using an Optical Diffuser and a Contact Aligner, Applied Physics Letters, 2008, pp. 194102-1-194102-3, vol. 92, American Insitute of Physics, College Park, MD, USA.

Yongmin Liu and Xiang Zhang, "Metamaterials: a new frontier of science and technology," Chem. Soc. Rev., 2011, 40, 2494-2507.

\* cited by examiner

METHOD OF CALIBRATING A NANOMETROLOGY INSTRUMENT

CROSS-REFERENCE TO RELATED APPLICATIONS

This application claims priority to U.S. Provisional Patent Application Ser. No. 62/057,333, entitled "CALIBRATION REFERENCE TO NANOMETROLOGY," to Christophersen et al., which was filed on 30 Sep. 2014 and is incorporated herein by reference. This application further is a continuation-in-part application to, and claims priority to, U.S. patent application Ser. No. 14/269,292, entitled "FABRICATION METHOD FOR DIGITAL ETCHING OF NANOMETER-SCALE LEVEL STRUCTURES," to Boudreau et al., which was filed on 5 May 2013 and is incorporated herein by reference.

BACKGROUND OF THE INVENTION

Field of the Invention

This invention relates in general to a method for calibrating a scanner, and in particular to a method of calibrating a nanometrology device.

Description of the Related Art

Conventional spectrometers typically use dispersive elements to separate light into its spectral components, requiring space and precise alignment of delivery optics. The requirement of holding imaging optics and dispersive optics in precise alignments adds substantially to the size, weight, and assembly costs of optical systems. The size, weight and cost of spectrometers can be reduced by building an integrated optical device on the image sensor. Such an integrated system has further advantages relative to a grating spectrometer in its robust alignment and its sensitivity.

Several types of integrated spectrometers have been demonstrated by using micro-scale Fabry-Perot etalons. A Fabry-Perot etalon is typically made of a transparent medium bounded by two reflecting surfaces to create an optical cavity. The transmission spectrum of the cavity exhibits peaks of transmission corresponding to resonances of the optical cavity. The position of resonances depends very sensitively on the cavity length and the index of the material in the cavity. Required tolerances for cavity length can be of nanometer order, making fabrication challenging.

The standard way to micro-fabricate optically flat steps with nanometer-scale height control is to sequentially etch levels into a dielectric material. Each level is done in a single lithographic and subsequent etching step. There are ways to reduce the number of process steps, such as "combinatorial etching." Essentially, one needs to perform a square-root of micro-fabrication steps for the overall step amount. Even this approach leaves ~31 micro-fabrication steps for a structure with 1,000 levels. Because each micro-fabrication step is time consuming and adds costs, minimizing the amount of fabrication steps is desired. For comparison, a typical commercial chip, depending on its complexity, requires 8-32 lithography steps. The resulting fabrication of a 1,000 level structure by digital etching is quite an effort. Other approaches use grey-scale lithography to fabricate steps in a single lithograph step, but the variability of etch processes and material homogeneity usually limit the number of truly distinct levels to around 100-400 levels.

The U.S. federal government has a long history for research in the miniaturization of electronics. Early efforts focused on 2 nm structures and led to superlattice technologies. Programs in the 1980's sought to exploit new tools like "scanning tunneling microscopy" ("STM") and atomic force microscopy ("AFM"). STM and AFM are now standard tools for today's nanotechnology.

Since the invention of the STM by IBM in 1982, a family of similar techniques known as scanning probe microscopy ("SPM") has developed quickly into a powerful tool for surface and nano-science. Among these techniques is AFM, introduced in 1986. Similar to STM, AFM uses a sharp probe that scans the sample in a raster-fashion to detect changes in surface properties such as topography and charge distribution. Unlike STM, AFM does not require conductive samples; rather than measuring the tunneling current, AFM senses the interactive forces (Van der Waals, electrostatic, and magnetic forces, for example) that range from $10^{-9}$ to $10^{-6}$ N, between the tip and the sample surface. Excellent three-dimensional spatial resolution (with sub-nanometer scales) can be achieved, in contrast to other forms of microscopy that typically can offer only high resolution in lateral dimensions. However, measuring step speed on AFM images proves difficult due to spatial uncertainties associated with the electronics and mechanics of AFM. A common problem for sequential AFM imaging is the thermal drift of piezos that causes the scanner to move away from the original field of view. Hence, standards and references are required for proper operation of an AFM and to verify optimal operating conditions and calibration of the instrument. Standards are used to assure that the absolute measurements are correct, while references assure that the instrument is giving consistent results. For establishing calibrated topography measurements, the AFM scanner must be certified with calibration standards having pre-established dimensions in the X, Y and Z axis. References can be used for establishing that an AFM mode is operating correctly and for establishing the proper operation of the AFM. It is generally not difficult to obtain accurate XY calibration references. It is, however, much more difficult to obtain accurate Z-axis results. It is difficult to control Z piezo dynamics because, during scanning the X- and Y-axes move at a constant rate whiles the Z axis does not.

Calibration standards/references are needed to calibrate AFM in the vertical axis. For calibrations greater than 10 nm step height, standards or references are typically fabricated by etching patterns in a quartz substrate. Another type of reference is etched silicon, or silicon dioxide coated with a uniform layer of metal. When calibrating the instrument for Z height measurements below ~10 nm, nano-spheres, atomic terraces of silicon may be used as a reference specimen.

Height measurements in an AFM require that the piezoelectric ceramics in the Z axis of the microscope be both linear and calibrated. Due to the high cost of producing calibration standards, the microscope is often calibrated at only one height. However, if the relationship between the measured Z height and the actual Z height is not linear, then the height measurements will not be correct.

Process Specialties ("PSI") USA, Inc. sells a so-called "New Dual Thickness Technology" calibration reference. PSI's calibration reference, as its name implies, is limited to two heights for the determination of the linearity of metrology tools over a specific thickness range without the need to load and set-up a second standard.

BRIEF SUMMARY OF THE INVENTION

An embodiment of the invention includes a method of calibrating a topography metrology instrument. A calibration reference includes a substrate and a plurality of bi-layer stacks on the substrate is provided. Each bi-layer stack of the plurality of bi-layer stacks includes a plurality of bi-layer steps. At least one bi-layer step of the plurality of bi-layer steps includes two materials. The at least one bi-layer step of the plurality of bi-layer steps includes an etch stop layer and a bulk layer. The calibration reference includes a calibration reference step profile includes a plurality of predetermined bi-layer stack heights. The calibration reference step profile and the predetermined bi-layer stack heights are measured using a topography metrology instrument. The topography metrology instrument is calibrated based on the measured calibration reference step profile and the measured bi-layer stack heights.

DETAILED DESCRIPTION OF THE INVENTION

Figure 1:
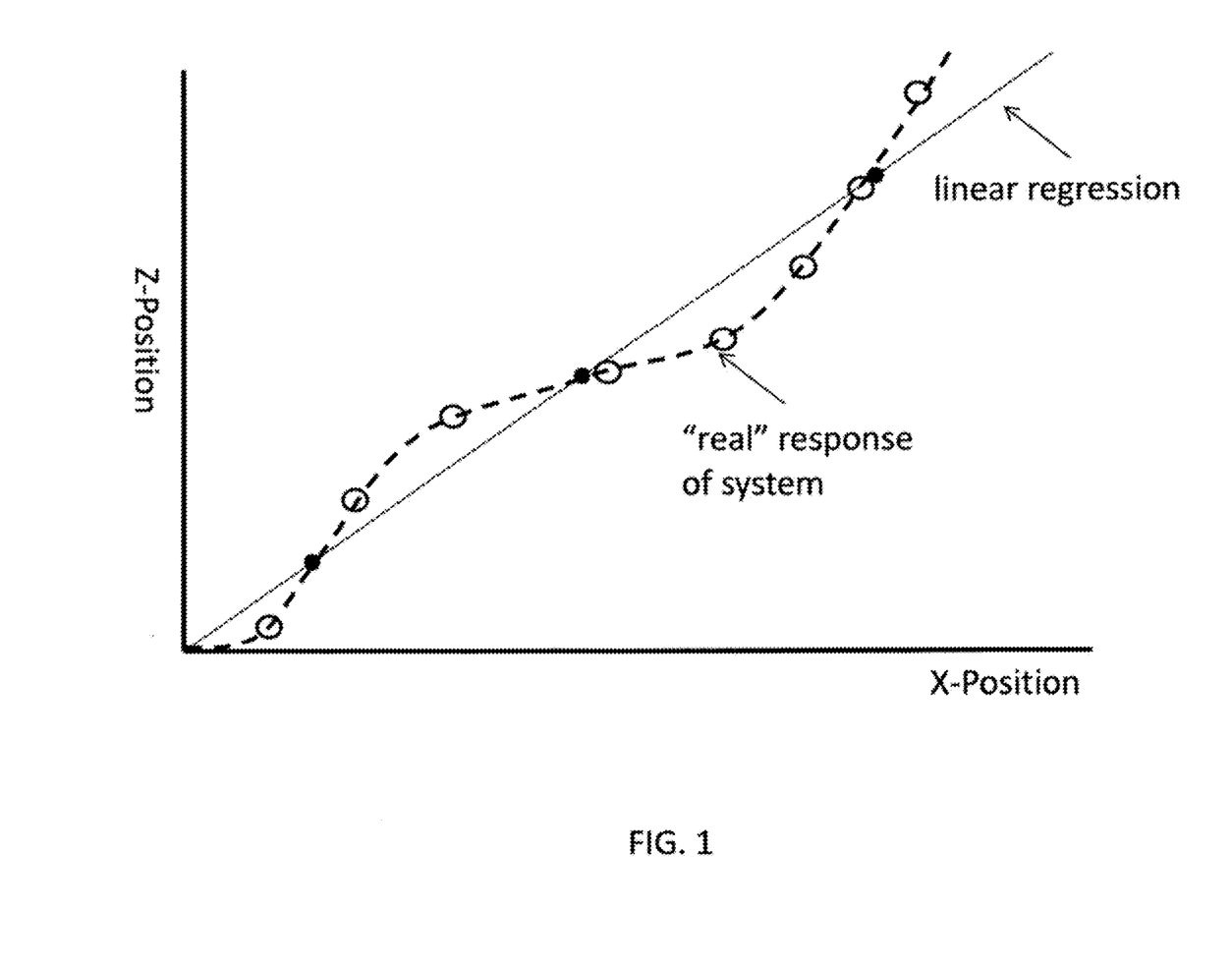
FIG. 1 is an illustrative calibration curve, according to the instant invention.

Referring by way of illustration to FIG. 1, Applicants recognized the difficulty of calibrating a nanometrology instrument. In FIG. 1, the X-position axis represents a horizontal dimension, and the Z-position axis represents a vertical or height dimension. The dotted line in FIG. 1 represents a theoretical system response from a nanometrology instrument. The theoretical system response is a linear regression line. The dashed line in FIG. 1 represents a more representative "real" response of the nanometrology instrument. Comparing the theoretical system response with the real response of the nanometrology instrument, Applicants recognized that the real response was not a linear regression. Applicants realized that if the nanometrology instrument were to be calibrated based on a few measured heights, e.g., as represented by black dots, the user calibrating the nanometrology instrument would assume a perfect, linear fit. However, as can be seen in FIG. 1, the real response includes points, e.g., represented by circles, above and below the linear regression line. Accordingly, Applicants determined that a calibration reference with multiple heights are needed for a correct calibration of the nanometrology instruments.

Figure 2:
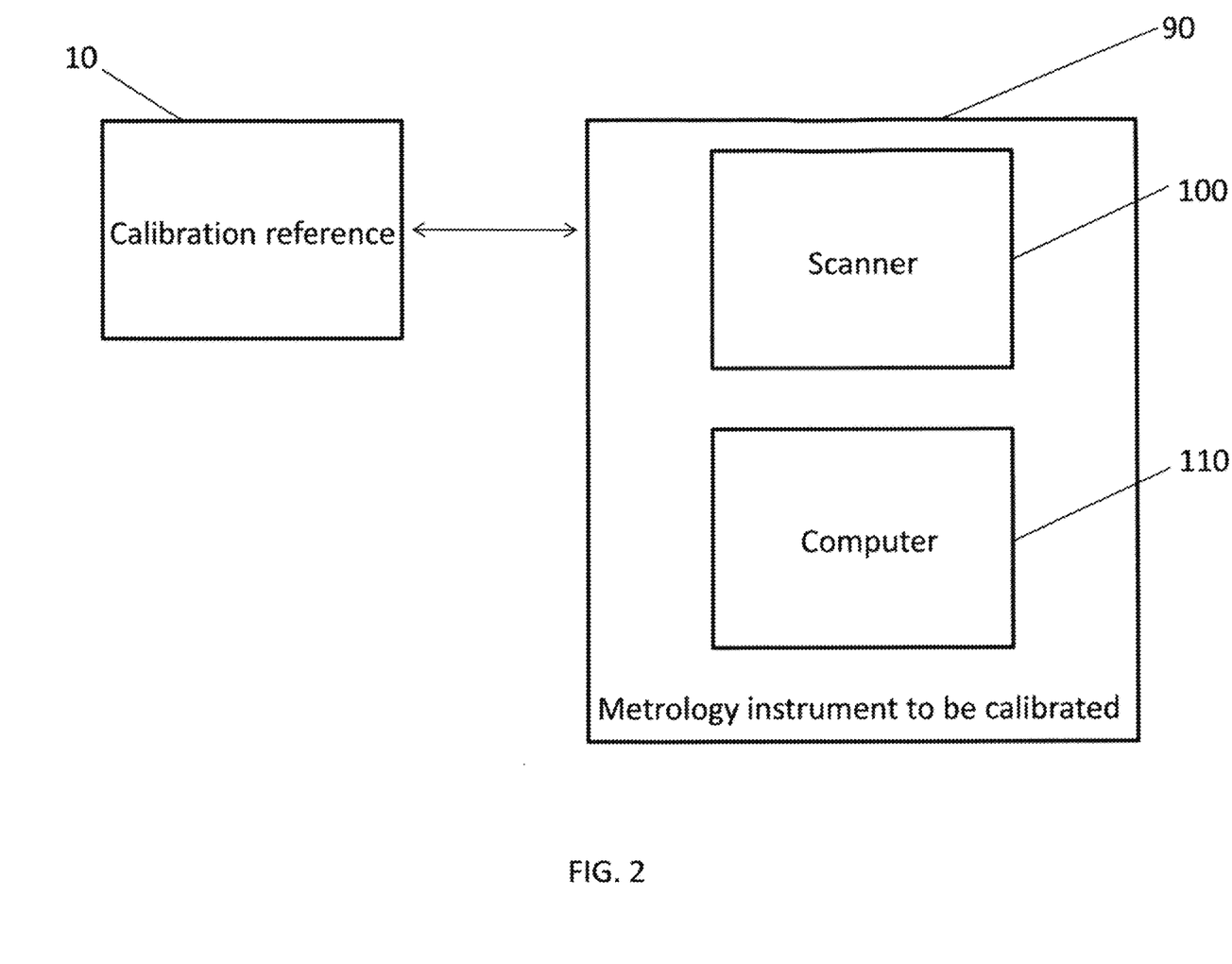
FIG. 2 is an illustrative block diagram of devices used in a method according to an embodiment of the instant invention.
Figure 3:
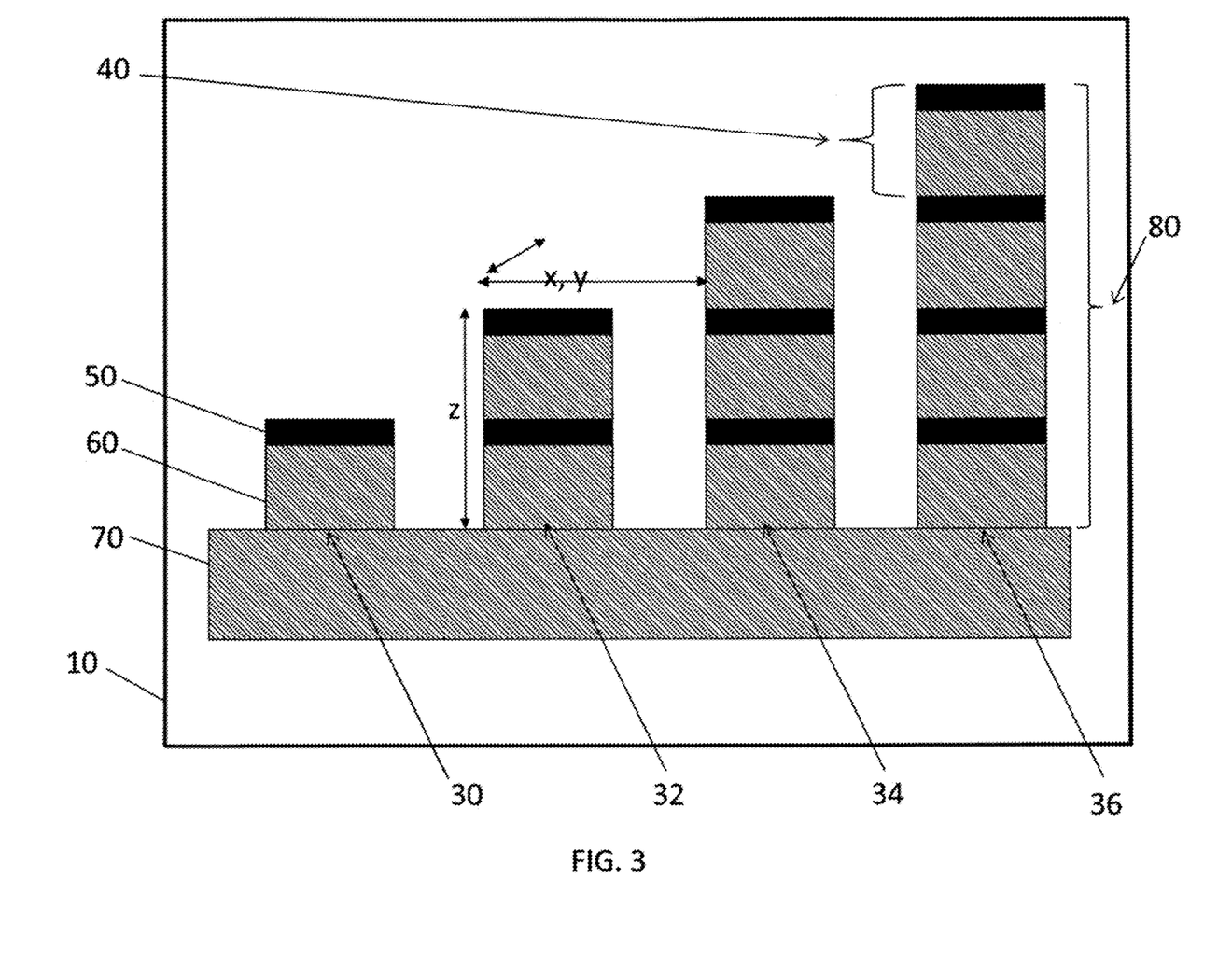
FIG. 3 is an illustrative calibration reference according to an embodiment of the instant invention, this calibration reference having neighboring step edges with a with defined distances in one lateral direction (i.e., the x-direction).
Figure 4:
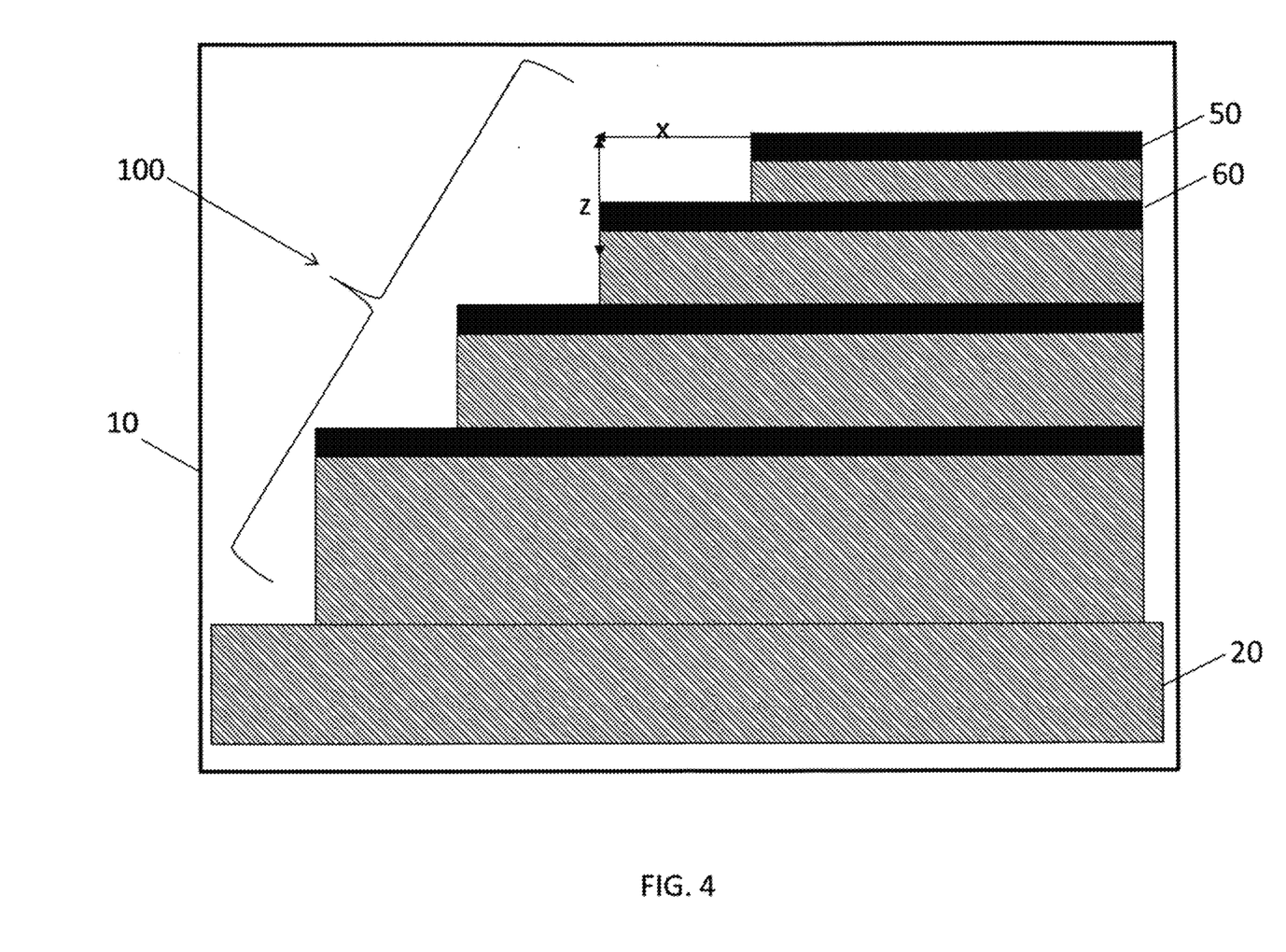
FIG. 4 is another illustrative calibration reference according to an embodiment of the instant invention, this calibration reference having neighboring step edges with defined distances in two lateral directions (i.e., the x- and y-directions).

An embodiment of the invention includes a method of calibrating a standard topography metrology instrument. This embodiment is described as follows with reference by way of illustration to FIGS. 2-4. A calibration reference 10 comprising a substrate 20 and a plurality of bi-layer stacks 30, 32, 34, 36 on the substrate is provided. The plurality of bi-layer stacks, for example, are laid out in a pattern or are laid out randomly (but are known, of course, after the layout). Optionally, the pattern includes a plurality of wedges together comprising a whole geometric shape (e.g., a circle, a triangle, a square. a pentagon, a hexagon, etc.), a plurality of concentric rings, a plurality of straight lines, a plurality of zig-zag lines, a plurality of enlarging geometric shapes (e.g., triangles, squares. pentagons, hexagons, etc.) with a common center. The bi-layer stacks stand-alone as shown by way of example in FIG. 3 or are unitary, such as the continuous ramp shown by way of example in FIG. 4. The hi-layer stacks, for example, increase in height linearly as shown by way of example in FIG. 3, or non-linearly as shown by way of example in FIG. 4. One of ordinary skill in the art will readily appreciate that stand-alone bi-layer stacks optionally have non-linearly increasing heights, and that unitary bi-layer stacks optionally have linearly increasing heights. In FIGS. 3 and 4, only four bi-layer stacks are shown for the sake of simplicity, though not for the sake of accuracy. As will be discussed below, an embodiment of the invention preferably includes more bi-layer stacks for calibration. However, one of ordinary skill will readily appreciate that the more bi-layer stacks with differing heights, the better the calibration of the topography metrology instrument.

Figure 5:
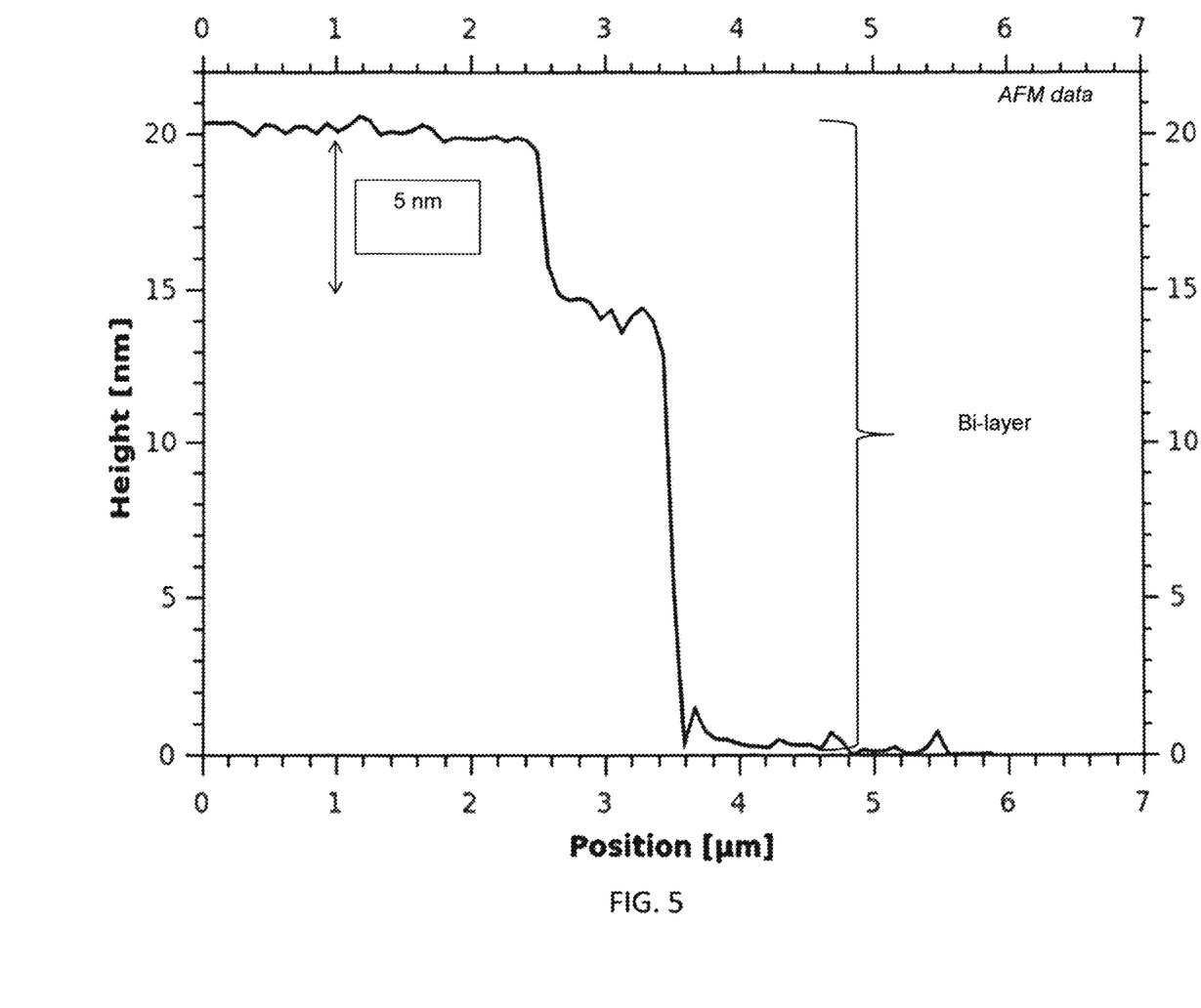
FIG. 5 is an illustrative graph of an atomic force microscope scan of a single bi-layer from an illustrative calibration reference according to an embodiment of the instant invention.

The calibration reference, each bi-layer stack of the plurality of bi-layer stacks 30, 32, 34, 36 comprising a plurality of bi-layer steps, at least one bi-layer step 40 of the plurality of bi-layer steps comprising two materials. The at least one bi-layer step 40 of the plurality of bi-layer steps includes an etch stop layer 50 and a bulk layer 60. An example of an illustrative atomic force microscope scan of a single bi-layer step is shown by way of example in FIG. 5. The scan in FIG. 5 shows an illustrative bi-layer step including a 15 nm $SiO_2$ layer and a readily identifiable 5 nm $Al_2O_2$ layer. The calibration reference 10 comprising a calibration reference step profile 70 comprising a plurality of predetermined bi-layer stack heights 80.

The calibration reference step profile 70 and the predetermined bi-layer stack heights 80 are measured using a standard topography metrology instrument 90. The topography metrology instrument, for example, includes a standard scanner 100. The scanner 100 communicates with a standard computer 110 within the topography metrology instrument 90, as shown in FIG. 2, or with a standard computer outside of the topography metrology instrument, (not shown). The topography metrology instrument 90 is calibrated based on the measured calibration reference step profile and the measured bi-layer stack heights. In other words, a user would adjust the instrument or its software settings until a calibration reference fit curve and the measured data points match.

Figure 6A:
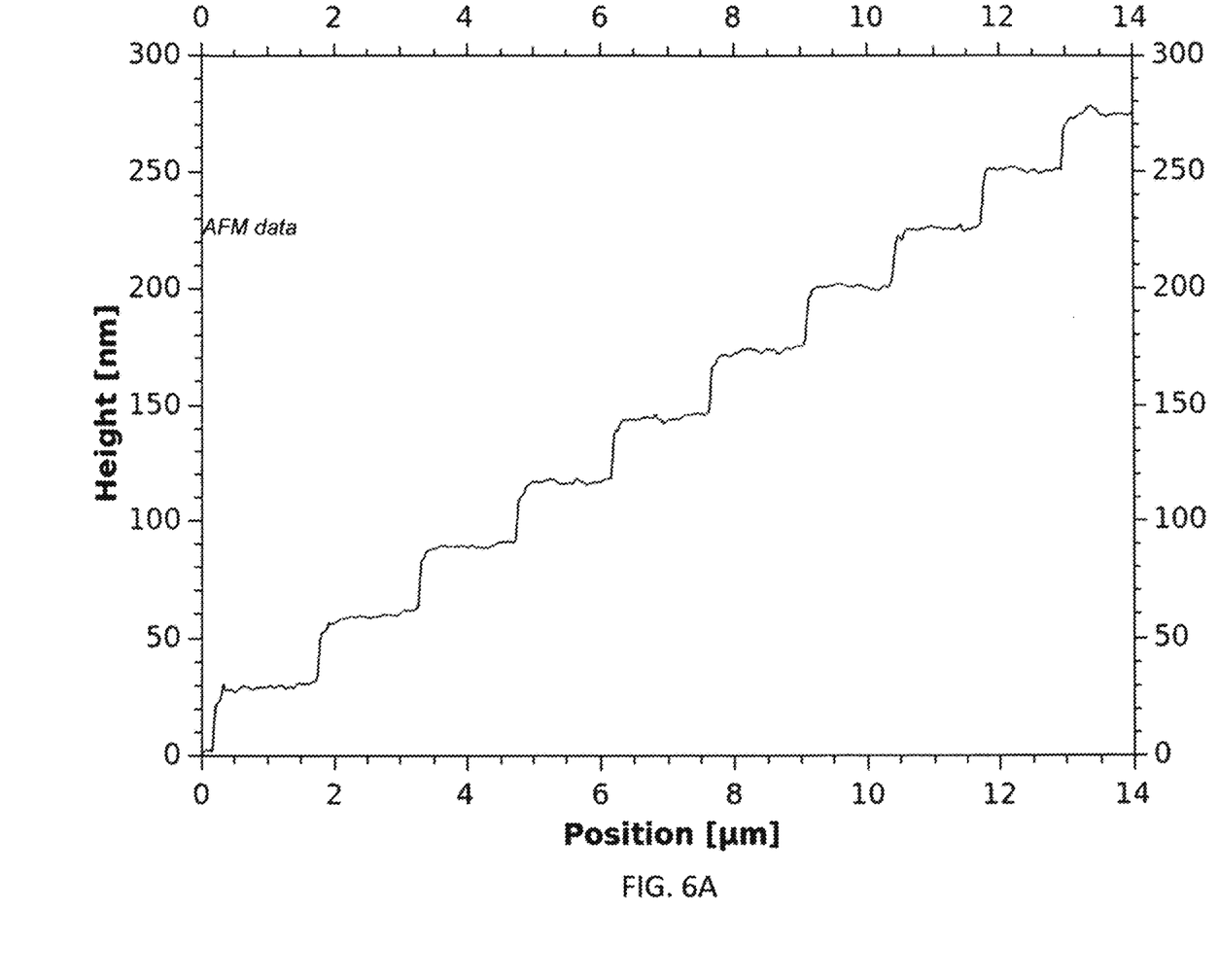
FIG. 6A is an illustrative graph of an atomic force microscope scan from an illustrative calibration reference according to an embodiment of the instant invention.
Figure 6B:
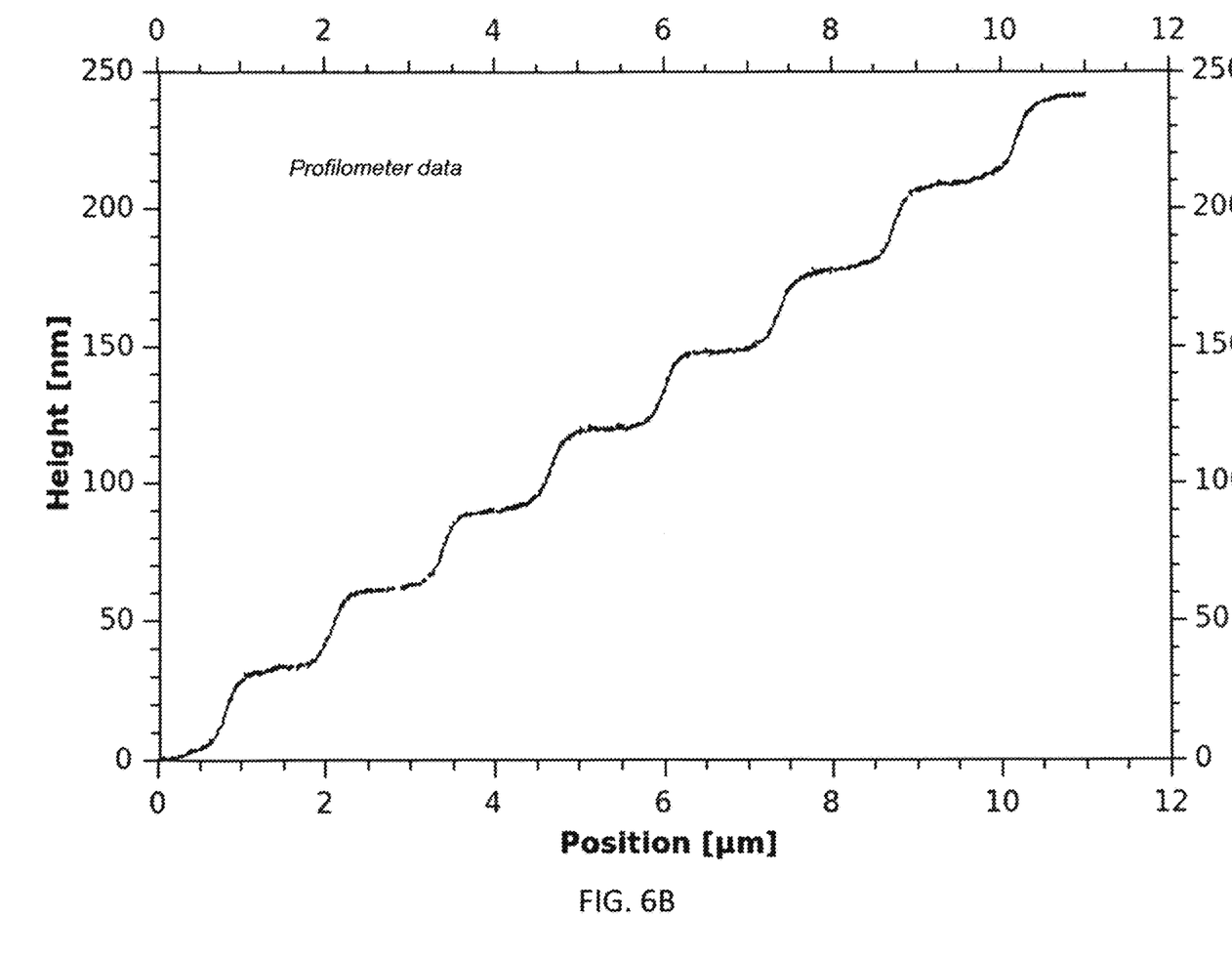
FIG. 6B is an illustrative graph of a stylus profilometer scan from an illustrative calibration reference according to an embodiment of the instant invention.
Figure 7:
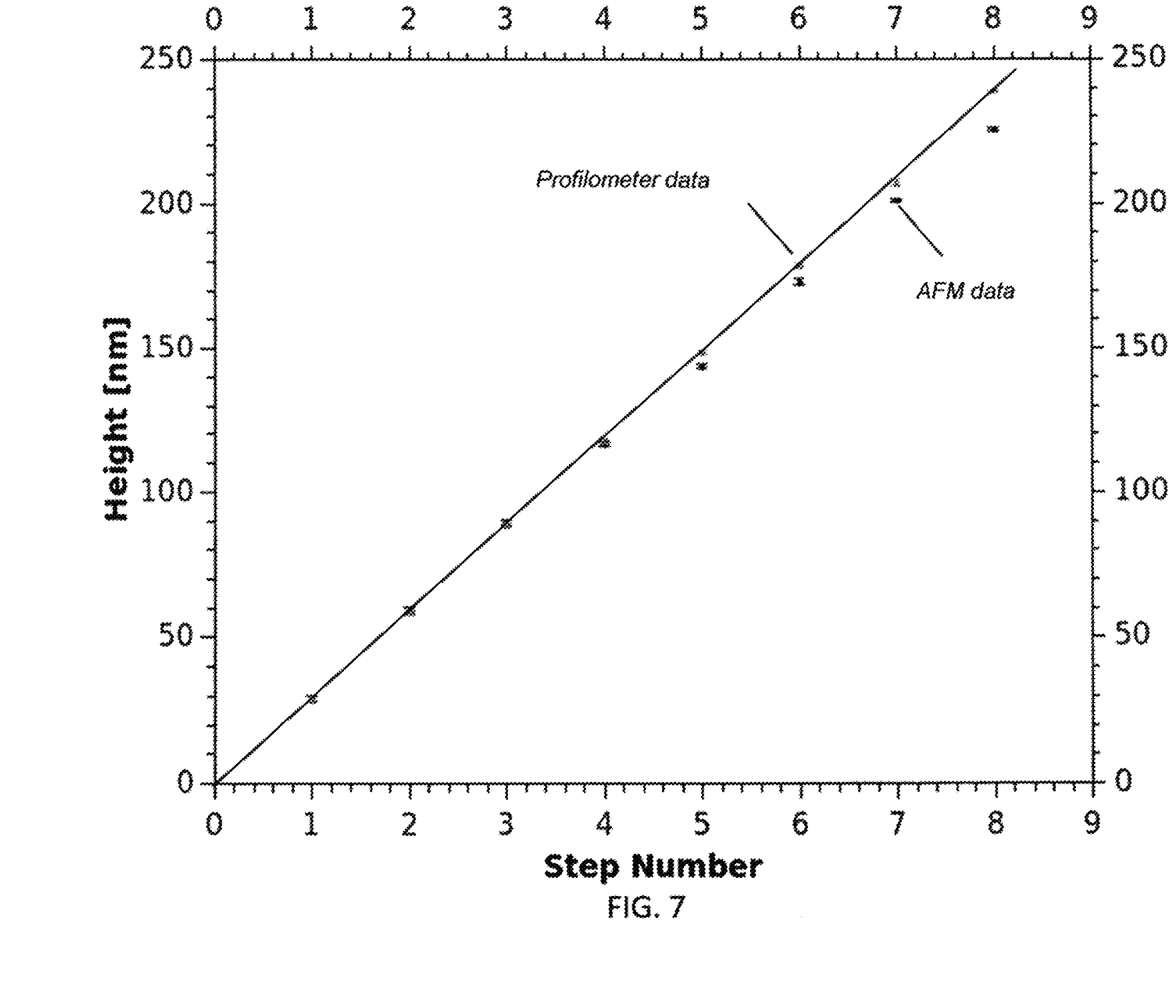
FIG. 7 is an illustrative graph of measured step heights using illustrative stylus profilometer data and illustrative atomic force microscope data in relation to an illustrative calibration reference according to an embodiment of the instant invention.

An example of an atomic force microscope scan of an illustrative calibration reference step profile with multiple predetermined bi-layer stack heights is shown by way of example in FIG. 6A. An example of a stylus profilometer scan of an illustrative calibration reference step profile with multiple predetermined bi-layer stack heights is shown by way of example in FIG. 6B. The error bars represent, for example, thermal drift and/or equipment vibrations. The average measured heights of the calibration reference step profiles shown in FIGS. 6A and 6B are graphed by way of example in FIG. 7. As can be seen in FIG. 7, the measured stack heights with the stylus profilometer (designated with black Xs) match fit curve representing the stack heights of the calibration reference. FIG. 7 shows by way of example stacks having two steps. The measured stack heights with the illustrative atomic force microscope (designated with gray Xs) match the fit curve of the stack heights of the calibration reference up to about 120 nm. In other words, there is a substantially linear relationship between the measured stack heights with the illustrative atomic force microscope (designated with gray Xs) and the stack heights of the calibration reference less than about 120 nm.

Optionally, the topography metrology instrument includes an atomic force microscope, an optical profilometer, a stylus profilometer, a spectral reflectometer, or an electron microscope.

Optionally, the each bi-layer stack of the plurality of bi-layer stacks 30, 32, 34, 36 includes a top surface roughness less than 3 nm root mean squared.

Optionally, each predetermined bi-layer stack height of the plurality of predetermined bi-layer stack heights 80 is less than 10 nm.

Optionally, each predetermined bi-layer stack height of the plurality of predetermined bi-layer stack heights 80 is greater than 100 nm.

Optionally, the etch stop layer 50 includes $Al_2O_3$, AlN, $SiO_2$, $ZrO_2$, $HfO_2$, $Sc_2O_3$, $TiO_2$, ITO, $La_2O_3$, MgO, $Ta_2O_5$, $AlF_3$, $MgF_2$, ZnS, $Sb_2O_3$, $Bi_2O_3$, $PbF_2$, $NdF_3$, $Nd_2O_3$, NaF, ZnO, LiF, GdO, silicon, or amorphous silicon.

Optionally, the bulk layer 60 includes $ZrO_2$, $HfO_2$, $Sc_2O_3$, $TiO_2$, ITO, $La_2O_3$, MgO, $Ta_2O_5$, $AlF_3$, $MgF_2$, ZnS, $Sb_2O_3$, $Bi_2O_3$, $PbF_2$, $NdF_3$, $Nd_2O_3$, NaF, ZnO, LiF, GdO, $SiO_2$, silicon, or amorphous silicon.

Optionally, the plurality of bi-layer steps 40 comprises at least ten bi-layer steps.

Optionally, each bi-layer stack of the plurality of bi-layer stacks includes a reactive-ion-etched bi-layer stack. Optionally, the reactive-ion-etched bi-layer stack comprises an atomic-layer-etched bi-layer stack.

Optionally, the calibration reference step profile includes neighboring step edges, the neighboring step edges comprising a with defined distances in one lateral direction (x-direction), such as shown in FIG. 3.

Optionally, the calibration reference step profile includes neighboring step edges, the neighboring step edges including with defined distances in two lateral directions (x- and y-directions), such as shown in FIG. 4.

Portions of the invention operate in a standard computing operating environment, for example, a desktop computer, a laptop computer, a mobile computer, a server computer, and the like, in which embodiments of the invention may be practiced. While the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. According to an embodiment of the invention, the computer communicates directly or indirectly with the scanner. The computer is co-located with the scanner, adjacent to the scanner, or located at a distance from the scanner. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A method comprising:
providing a calibration reference comprising a substrate and a plurality of bi-layer stacks on the substrate, the substrate being parallel to the plurality of bi-layer stacks, each bi-layer stack of the plurality of bi-layer stacks comprising a plurality of bi-layer steps, the plurality of bi-layer stacks comprising at least ten bi-layer stacks, each bi-layer step of said plurality of bi-layer steps comprising a run and a riser, said run being at least ten times greater than the riser, at least one bi-layer step of the plurality of bi-layer steps comprising two materials, said at least one bi-layer step of the plurality of bi-layer steps comprising an etch stop layer and a bulk layer, the calibration reference comprising a calibration reference step profile comprising a plurality of predetermined bi-layer stack heights, measuring the calibration reference step profile and the predetermined bi-layer stack heights using a topography metrology instrument; and calibrating the topography metrology instrument based on the measured calibration reference step profile and the measured bi-layer stack heights, wherein said measuring the calibration reference step profile and the predetermined bi-layer stack heights using a topography metrology instrument comprises measuring data points corresponding to a number of bi-layers steps, wherein said calibrating the topography metrology instrument based on the measured calibration reference step profile and the measured bi-layer stack heights comprises calibrating the topography metrology instrument until a calibration reference fit curve and the measured data points match.

2. The method according to claim 1,
wherein a predetermined bi-layer stack height of the plurality of predetermined bi-layer stack heights is on an order of 7 nm.

3. The method according to claim 1, wherein topography metrology instrument comprises one of an atomic force microscope, an optical profilometer, a stylus profilometer, a spectral reflectometer, and an electron microscope.

4. The method according to claim 1, wherein the each bi-layer stack of the plurality of bi-layer stacks comprises a top surface roughness less than 3 nm root mean squared.

5. The method according to claim 1, wherein the calibration reference step profile is greater than 100 nm in height.

6. The method according to claim 1, wherein the etch stop layer comprises one of $Al_2O_3$, AlN, $SiO_2$, $ZrO_2$, $HfO_2$, $Sc_2O_3$, $TiO_2$, ITO, $La_2O_3$, MgO, $Ta_2O_5$, $AlF_3$, $MgF_2$, ZnS, $Sb_2O_3$, $Bi_2O_3$, $PbF_2$, $NdF_3$, $Nd_2O_3$, NaF, ZnO, LiF, GdO, silicon, and amorphous silicon.

7. The method according to claim 1, wherein the bulk layer comprises one of $ZrO_2$, $HfO_2$, $Sc_2O_3$, $TiO_2$, ITO, $La_2O_3$, MgO, $Ta_2O_5$, $AlF_3$, $MgF_2$, ZnS, $Sb_2O_3$, $Bi_2O_3$, $PbF_2$, $NdF_3$, $Nd_2O_3$, NaF, ZnO, LiF, GdO, $SiO_2$, silicon, and amorphous silicon.

8. The method according to claim 1, wherein the each bi-layer stack of the plurality of bi-layer stacks comprises a reactive-ion-etched bi-layer stack.

9. The method according to claim 8, wherein the reactive-ion-etched bi-layer stack comprises an atomic-layer-etched bi-layer stack.

10. The method according to claim 1, wherein the calibration reference step profile comprises neighboring step edges, the neighboring step edges are defined in one lateral direction.

11. The method according to claim 1, wherein the calibration reference step profile comprises neighboring step edges, the neighboring step edges are defined in two lateral directions.

* * * * *